United States Patent
Hu

(10) Patent No.: US 11,151,433 B2
(45) Date of Patent: Oct. 19, 2021

(54) BARCODE GENERATION METHODS AND APPARATUSES

(71) Applicant: Advanced New Technologies Co., Ltd., Grand Cayman (KY)

(72) Inventor: Zongwang Hu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,570

(22) Filed: May 29, 2020

(65) Prior Publication Data

US 2020/0311504 A1    Oct. 1, 2020

Related U.S. Application Data

(63) Continuation of application No. PCT/CN2018/123068, filed on Dec. 24, 2018.

(30) Foreign Application Priority Data

Jan. 3, 2018    (CN) .......................... 201810004563.6

(51) Int. Cl.
*G06K 19/06*    (2006.01)
*H04L 29/06*    (2006.01)

(52) U.S. Cl.
CPC . *G06K 19/06093* (2013.01); *G06K 19/06028* (2013.01); *H04L 67/42* (2013.01)

(58) Field of Classification Search
CPC ........ G06K 19/06093; G06K 19/06028; H04L 67/42
USPC .................................................. 235/494, 487
See application file for complete search history.

(56) References Cited

U.S. PATENT DOCUMENTS

2008/0191023 A1    8/2008  Harris
2014/0306019 A1*  10/2014  Windmueller ... G06K 19/06037
                                                      235/494

FOREIGN PATENT DOCUMENTS

| CN | 102663600 | 9/2012 |
|----|-----------|--------|
| CN | 103761656 | 4/2014 |
| CN | 103778403 | 5/2014 |
| CN | 203588283 | 5/2014 |
| CN | 104376339 | 2/2015 |
| CN | 106656908 | 5/2017 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.

(Continued)

*Primary Examiner* — Karl D Frech
(74) *Attorney, Agent, or Firm* — Fish & Richardson P.C.

(57) ABSTRACT

A server is used to receive a barcode generation request sent by an end-user device. The server is used to generate, based on the barcode generation request, at least two pieces of barcode information by using at least two code systems, respectively. The server is used to transmit a barcode generation response to the end-user device, where the barcode generation response includes the at least two pieces of barcode information, where the barcode generation response causes an application running on the end-user device to display on the end-user device, alternately, a respective barcode image corresponding to each piece of the at least two pieces of barcode information.

20 Claims, 5 Drawing Sheets

(56) References Cited

FOREIGN PATENT DOCUMENTS

| | | |
|---|---|---|
| CN | 108268920 | 7/2018 |
| TW | M551305 | 11/2017 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2018/123068, dated Jul. 7, 2020, 10 pages (with English translation).

PCT International Search Report and Written Opinion in International Application No. PCT/CN2018/123068, dated Mar. 22, 2019, 14 pages (with English translation).

blog.line.me [online], "[LINE Pay] Use teaching supplement," Aug. 4, 2015, retrieved on Jan. 12, 2021, retrieved from URL<http://official-blog.line.me/tw/archives/39016757.html>, 12 paged (with machine translation).

wordpress.com [online], "B1POS LINE Pay transaction process instruction (including payment and refund)," Jun. 14, 2017, retrieved on Jan. 12, 2021, retrieved from URL<https://jabezpos.wordpress.com/2017/07/04/b1pos-line-pay%e4%ba%a4%e6%98%93%e6%b5%81%e7%a8%8b%e6%95%99%e5%ad%b8/>, 27 pages (with machine translation).

\* cited by examiner

BARCODE GENERATION METHODS AND APPARATUSES

CROSS-REFERENCE TO RELATED APPLICATIONS

This application is a continuation of PCT Application No. PCT/CN2018/123068, filed on Dec. 24, 2018, which claims priority to Chinese Patent Application No. 201810004563.6, filed on Jan. 3, 2018, and each application is hereby incorporated by reference in its entirety.

TECHNICAL FIELD

The present specification relates to the field of network communications technologies, and in particular, to barcode generation methods and apparatuses.

BACKGROUND

A barcode is a group of bars and null symbols arranged based on a specific coding rule, and is used to represent information that includes specific characters, numbers, and symbols. The barcode includes a one-dimensional barcode and a two-dimensional barcode. The one-dimensional barcode expresses information by arranging multiple black bars and spacings with different widths based on a certain rule. The two-dimensional barcode (also referred to as a two-dimensional code) records information by using black and white figures distributed on a plane (in a two-dimensional direction) based on a specific rule.

With development of mobile interconnection technologies and popularization of intelligent end-user devices, barcodes are increasingly widely applied, and people are increasingly accustomed to using barcodes to complete various items. When the barcodes cannot be correctly recognized, time waste, poor user experience, and even transaction failures are usually caused. Increasing a barcode recognition rate is an important aspect of barcode application.

SUMMARY

In view of this, the present specification provides a barcode generation method, applied to a server, where the method includes: receiving a barcode generation request sent by an end-user device; generating at least two pieces of barcode information by using at least two code systems respectively based on the barcode generation request; and returning a barcode generation response to the end-user device, where the barcode generation response includes the at least two pieces of generated barcode information, so that the end-user device alternately displays each barcode image corresponding to each piece of the at least two pieces of barcode information.

The present specification provides a barcode generation method, applied to an end-user device, where the method includes: sending a barcode generation request to a server; receiving a barcode generation response returned by the server, where the barcode generation response includes at least two pieces of barcode information generated by the server by using different code systems based on the barcode generation request; and alternately displaying each barcode image corresponding to each piece of the at least two pieces of barcode information.

The present specification provides a barcode generation method, applied to a barcode provider, where the method includes: receiving a barcode generation instruction; generating barcode images by using at least two code systems based on the barcode generation instruction; and alternately displaying each of the barcode images.

The present specification further provides a barcode generation apparatus, applied to a server, where the apparatus includes: a barcode generation request receiving unit, configured to receive a barcode generation request sent by an end-user device; a barcode information generation unit, configured to generate at least two pieces of barcode information by using at least two code systems respectively based on the barcode generation request; and a barcode generation response sending unit, configured to return a barcode generation response to the end-user device, where the barcode generation response includes the at least two pieces of generated barcode information, so that the end-user device alternately displays each barcode image corresponding to each piece of the at least two pieces of barcode information.

The present specification provides a barcode generation apparatus, applied to an end-user device, where the apparatus includes: a barcode generation request sending unit, configured to send a barcode generation request to a server; a barcode generation response receiving unit, configured to receive a barcode generation response returned by the server, where the barcode generation response includes at least two pieces of barcode information generated by the server by using different code systems based on the barcode generation request; and an alternate barcode image display unit, configured to alternately display each barcode image corresponding to each piece of the at least two pieces of barcode information.

The present specification provides a barcode generation apparatus, applied to a barcode provider, where the apparatus includes: a barcode generation instruction receiving unit, configured to receive a barcode generation instruction; a barcode image generation unit, configured to generate barcode images by using at least two code systems based on the barcode generation instruction; and a barcode image display unit, configured to alternately display each of the barcode images.

The present specification provides a computer device, including a memory and a processor, where the memory stores a computer program that can be run by the processor, and when the processor runs the computer program, the steps of the barcode generation method applied to the server are performed.

The present specification provides an end-user device, including a memory and a processor, where the memory stores a computer program that can be run by the processor, and when the processor runs the computer program, the steps of the barcode generation method applied to the end-user device are performed.

The present specification provides a computer device, including a memory and a processor, where the memory stores a computer program that can be run by the processor, and when the processor runs the computer program, the steps of the barcode generation method applied to the barcode provider are performed.

The present specification further provides a computer-readable storage medium, where the computer-readable storage medium stores a computer program, and when the computer program is run by a processor, the steps of the barcode generation method applied to the server are performed.

The present specification provides a computer-readable storage medium, where the computer-readable storage medium stores a computer program, and when the computer program is run by a processor, the steps of the barcode generation method applied to the end-user device are performed.

The present specification provides a computer-readable storage medium, where the computer-readable storage medium stores a computer program, and when the computer program is run by a processor, the steps of the barcode generation method applied to the barcode provider are performed.

It can be seen from the previous technical solutions that in an implementation of the present specification, after receiving the barcode generation request of the end-user device, the server generates the at least two pieces of barcode information corresponding to different code systems, and returns the at least two pieces of barcode information to the end-user device, so that the end-user device alternately displays the barcode image corresponding to each piece of these pieces of barcode information. As such, a barcode scanning device can complete barcode recognition provided that one of the barcode images can be read. Therefore, barcode scanning failures caused by low resolution of the barcode scanning device, limited supported code systems, etc. are greatly reduced, and a barcode recognition rate is increased.

In another implementation of the present specification, after receiving the barcode generation instruction, the barcode provider generates the barcode images by using the at least two code systems, and alternately displays each of the barcode images. As such, a barcode scanning device can complete barcode recognition provided that one of the barcode images can be read. Therefore, barcode scanning failures caused by low resolution of the barcode scanning device, limited supported code systems, etc. are greatly reduced, and a barcode recognition rate is increased.

DESCRIPTION OF IMPLEMENTATIONS

Figure 1:
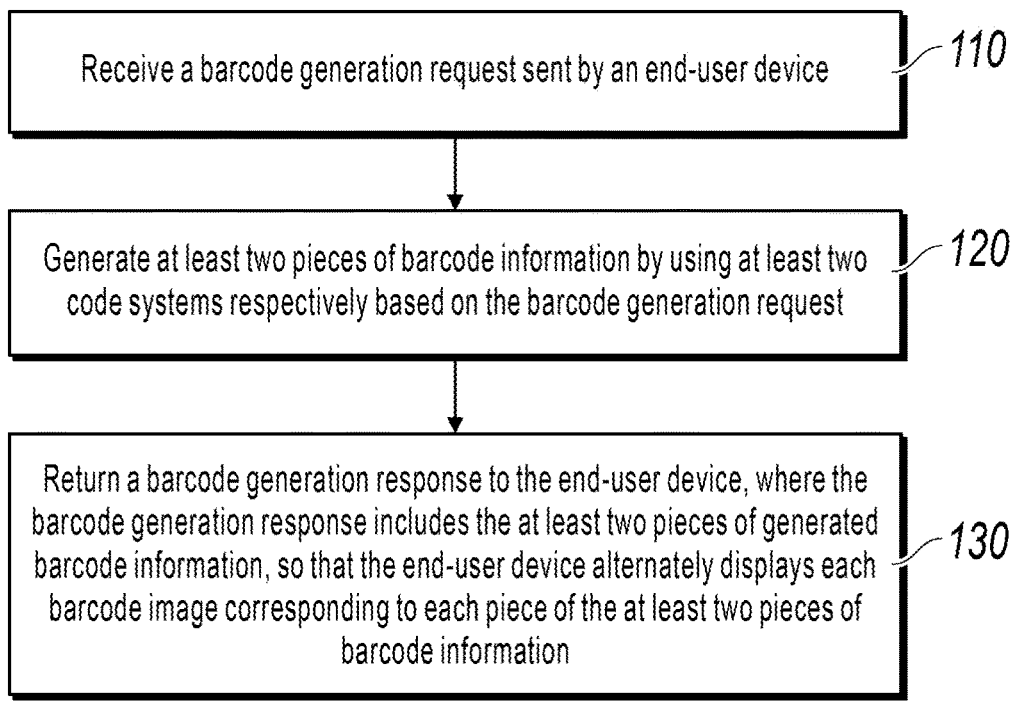
FIG. 1 is a flowchart illustrating a barcode generation method applied to a server, according to Implementation 1 of the present specification.

A code system is a coding mode for a barcode. Each code system has its own coding rule and character set. A one-dimensional barcode has more than 100 code systems. Commonly used code systems include a uniform production code (UPC), a European article number (EAN) code, code 39, interleaved 2 of 5 code, code 128, code 93, a Codabar code, etc. Code systems of a two-dimensional barcode include a data matrix, a quick response (QR) code, a MaxiCode code, a Vericode code, a portable data file (PDF) 417, etc.

To generate a barcode, original information is usually first encoded based on a used code system to obtain barcode data (which is usually a string); and then a barcode image is generated by using the barcode data.

When different code systems are used, barcode images that are with the same length (for one-dimensional barcodes) or the same area (for two-dimensional barcodes) and are generated by using the same original information usually differ in density. A density of a barcode image refers to the quantity of characters represented by a barcode with a unit length or a unit area. A higher density imposes higher needs on resolution of a barcode scanning device, and a barcode scanning device with low resolution cannot achieve a satisfactory recognition rate. In addition, each barcode scanning device has its own reading range. Some barcode scanning devices can read many code systems at the same time, and some barcode scanning devices can read only one or a few code systems. Whether a code system matches a barcode scanning device exerts great impact on a barcode recognition rate.

Implementation 1 of the present specification provides a new barcode generation method in which an end-user device sends a barcode generation request to a server, and the server generates at least two pieces of barcode information by using at least two code systems respectively, and returns the barcode information to the end-user device, so that the end-user device alternately displays each barcode image corresponding to each piece of the at least two pieces of barcode information. During barcode scanning, a barcode scanning device can complete recognition provided that one of the barcode images can be read. Barcode images of two or more different code systems are provided, so that a recognition rate of the barcode scanning device can be greatly increased, and needs on resolution and a supported code system of the barcode scanning device in various service scenarios can be reduced.

In Implementation 1 of the present specification, in a certain service process of a network service provider, an end-user device displays a barcode for scanning by a barcode scanning device of a scanning party, and the service is continued after the scanning party reads the barcode. The barcode displayed by the end-user device is determined by a server of the network service provider, and the end-user device obtains, by interacting with the server, information about a barcode to be displayed.

The end-user device can be a device such as a mobile phone, a tablet computer, a personal computer (PC), or a laptop. The server can run on a physical or logical device, or two or more physical or logical devices that assume different responsibilities can cooperate with each other to implement functions of the server in Implementation 1 of the present specification. A type of the end-user device, a type of a device in which the server is located, and a type, a protocol, etc. of a communications network between the end-user device and the server are not limited in the present implementation of the present specification.

Figure 2:
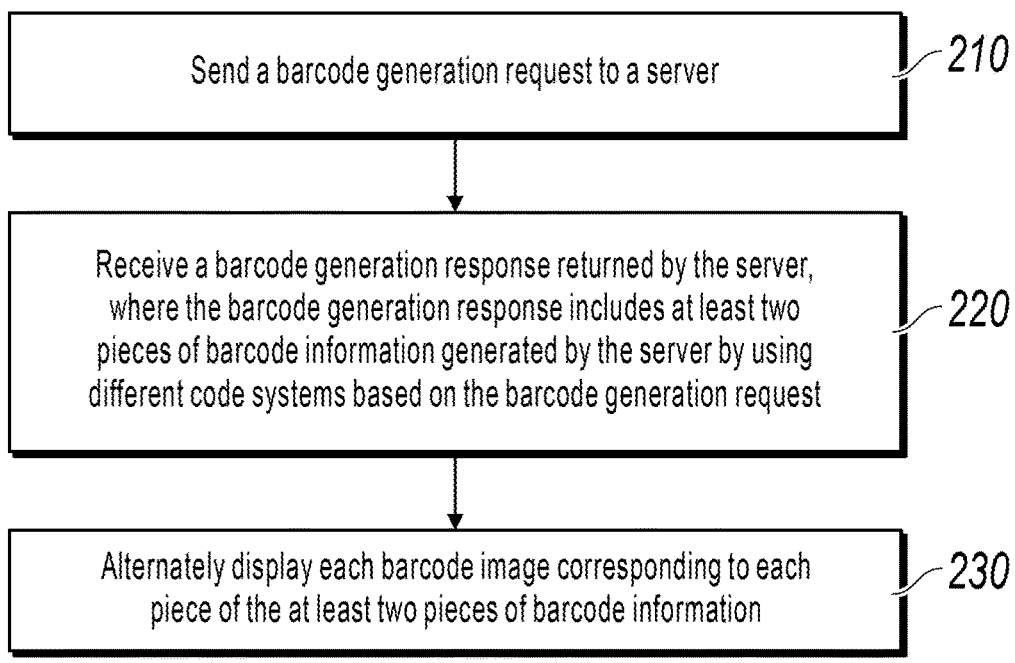
FIG. 2 is a flowchart illustrating a barcode generation method applied to an end-user device, according to Implementation 1 of the present specification.

In Implementation 1 of the present specification, a procedure of applying the barcode generation method to the server is shown in FIG. 1, and a procedure of applying the barcode generation method to the end-user device is shown in FIG. 2.

At the end-user device, in step 210, a barcode generation request is sent to the server.

At the server, in step 110, a barcode generation request sent by the end-user device is received.

Based on a specific running method of a service process in an actual application scenario, when needing to display a barcode for scanning by a barcode scanning party in the service process, the end-user device sends the barcode generation request to the server. The barcode generation request usually includes related information used to describe the service process.

An executed service, specific steps of the service process, the service-related information included in the barcode generation request, etc. are not limited in the present implementation of the present specification.

At the server, in step 120, at least two pieces of barcode information are generated by using at least two code systems respectively based on the barcode generation request.

After receiving the barcode generation request, the server determines original information of the barcode based on the service-related information in the barcode generation request, and encodes the original information by using two or more code systems to generate barcode data corresponding to each code system. The server can use the barcode data of each code system as one piece of barcode information. Alternatively, the server can generate a barcode image by using each piece of barcode data, and use the barcode image of each code system as one piece of barcode information.

The quantity of code systems used by the server and which code systems to be used can be determined based on factors such as a data amount of the original information in an actual application scenario, a character set, and resolution of a barcode scanning device. Implementations are not limited in the present implementation of the present specification. In an implementation, the server can predetermine N (N is a natural number greater than or equal to 2) code systems, and generate N pieces of barcode information by using the N code systems for each barcode generation request.

In another implementation, the server can determine the at least two code systems based on information about a barcode scanning party, and generate barcode information by using each determined code system based on the barcode generation request. The server can obtain the information about the barcode scanning party by using any method supported by the application scenario. Implementations are not limited in the present implementation of the present specification. For example, the information about the barcode scanning party can be provided by the end-user device, and is included in the barcode generation request and sent to the server. The information about the barcode scanning party can be alternatively included in the service information in the barcode generation request, and is extracted from the service information by the server. The information about the barcode scanning party can be alternatively obtained by the server based on positioning information of the end-user device. The information about the barcode scanning party can be an account of the barcode scanning party at the server, a name and a model number of a barcode scanning device of the barcode scanning party, a performance parameter of the barcode scanning device of the barcode scanning party, etc. Implementations are not limited either.

For example, resolution of a barcode scanning device of each merchant and a mapping relationship between resolution of a barcode scanning device and at least two code systems can be predetermined at the server. The server determines a merchant in which the end-user device is currently located based on the positioning information of the end-user device, determines resolution of a barcode scanning device of the merchant, and then finds several code systems corresponding to the resolution of the barcode scanning device.

At the server, in step 130, a barcode generation response is returned to the end-user device, where the barcode generation response includes at least two pieces of generated barcode information, so that the end-user device alternately displays each barcode image corresponding to each piece of the at least two pieces of barcode information.

At the server, in step 220, a barcode generation response returned by the server is received, where the barcode generation response includes the at least two pieces of barcode information generated by the server by using different code systems based on the barcode generation request.

The server encapsulates the two or more pieces of generated barcode information in the barcode generation response, and returns the barcode generation response to the end-user device.

At the end-user device, in step 230, each barcode image corresponding to each piece of the at least two pieces of barcode information is alternately displayed.

The end-user device extracts each piece of barcode information from the barcode generation response. If the barcode information is barcode data, the end-user device generates a barcode image by using each piece of barcode information, and then alternately displays each barcode image. If the barcode information is a barcode image, the end-user device directly alternately displays each barcode image.

When each barcode image is alternately displayed, the end-user device can sequentially display each barcode image corresponding to each piece of the at least two pieces of barcode information in a predetermined duration, or can set different durations for barcode images corresponding to different pieces of barcode information, and sequentially display each barcode image based on the specified durations (for example, a longer display duration is set for a barcode image corresponding to barcode information with a higher rank).

When the barcode scanning device scans the barcode image displayed by the end-user device, if a certain barcode image cannot be correctly recognized, the barcode scanning device continues to recognize the next barcode image displayed after the barcode image until one of the barcode images can be correctly recognized. As such, there is no need to change the barcode scanning device, and a recognition rate can be greatly increased by alternately displaying several barcode images.

It can be seen that in Implementation 1 of the present specification, after receiving the barcode generation request of the end-user device, the server generates the barcode information by using the at least two code systems, and returns the barcode information to the end-user device, so that the end-user device alternately displays each barcode image corresponding to each piece of barcode information. As such, the barcode scanning device can complete recognition provided that one of the barcode images can be read. Therefore, a recognition rate of the barcode scanning device can be greatly increased, and needs on resolution and a supported code system of the barcode scanning device in various service scenarios can be reduced.

Implementation 2 of the present specification provides a new barcode generation method in which a barcode provider generates barcode images by using two code systems based on a barcode generation instruction, and alternately displays each of the barcode images. During barcode scanning, a barcode scanning device can complete recognition provided that one of the barcode images can be read. Barcode images of two or more different code systems are provided, so that a recognition rate of the barcode scanning device can be greatly increased, and needs on resolution and a supported code system of the barcode scanning device in various service scenarios can be reduced.

In Implementation 2 of the present specification, a device of the barcode provider independently generates barcode images of at least two code systems. Implementation 2 of the present specification can run on any device having computing and storage capabilities, for example, devices such as a mobile phone, a tablet computer, a personal computer (PC), a laptop, and a server.

Figure 3:
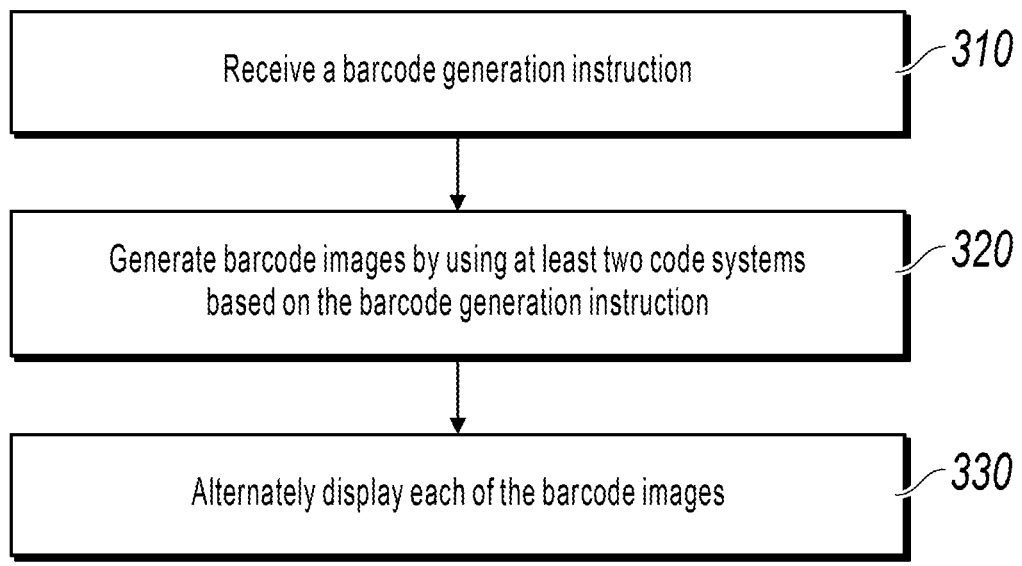
FIG. 3 is a flowchart illustrating a barcode generation method applied to a barcode provider, according to Implementation 2 of the present specification.

In Implementation 2 of the present specification, a procedure of the barcode generation method is shown in FIG. 3. The method is applied to the barcode provider, namely, a party that displays a barcode for scanning by a barcode scanning device of a barcode scanning party.

Step 310: Receive a barcode generation instruction.

The barcode generation instruction can be an operation of instructing, by a user, to generate a barcode in a certain service process, can be an invoking request for generating a barcode by a certain software function module running on the device of the barcode provider, or can be another instruction of generating a barcode. Implementations are not limited. In addition, the barcode generation instruction can include service-related information needed for generating a barcode. Alternatively, service-related information needed for generating a barcode can be obtained by using a service process of the barcode generation instruction. Implementations are not limited either.

Step 320: Generate barcode images by using at least two code systems based on the barcode generation instruction.

The barcode provider determines original information of the barcode based on the service-related information in the barcode generation instruction, encodes the original information by using two or more code systems to generate barcode data corresponding to each code system, and then generates a barcode image by using each piece of barcode data.

The quantity of code systems used by the barcode provider and which code systems to be used can be determined based on factors such as a data amount of the original information in an actual application scenario, a character set, and resolution of the barcode scanning device that may be used by the barcode scanning party. Implementations are not limited in the present implementation of the present specification. In an implementation, the barcode provider can predetermine N code systems, and respectively generate N barcode images by using the N code systems for each barcode generation instruction.

In another implementation, the barcode provider can determine N code systems based on the barcode generation instruction, and respectively generate barcode images by using the determined N code systems. For example, the barcode provider can determine the N code systems based on the service-related information in the barcode generation instruction. Several different code systems can be used for different service-related information. For another example, a default code system can be set, and then the user specifies at least one other code system to be used in the barcode generation instruction.

Step 330: Alternately display each of the barcode images.

The barcode provider sequentially displays each of the generated barcode images. When alternately displaying each of the barcode images, the barcode provider can sequentially display each of the images in a predetermined duration, or can set different durations for barcode images of different code systems, and sequentially display each of the barcode images of the code systems based on the specified durations.

It can be seen that in Implementation 2 of the present specification, after receiving the barcode generation instruction, the barcode provider generates the barcode images by using the at least two code systems, and alternately displays each of the barcode images. As such, the barcode scanning device can complete recognition provided that one of the barcode images can be read. Therefore, a recognition rate of the barcode scanning device can be greatly increased, and needs on resolution and a supported code system of the barcode scanning device in various service scenarios can be reduced.

Specific implementations of the present specification are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing can be advantageous.

It is worthwhile to note that the barcode in Implementation 1 and Implementation 2 of the present specification can be a one-dimensional barcode, or can be a two-dimensional barcode.

In an application example of the present specification, after a user installs a payment application (APP) of a third-party payment platform on an end-user device, a payment barcode of the user can be displayed in the payment APP, and after a scanning device of a merchant scans the payment barcode, a payment is collected from an account of the user on the third-party payment platform, to complete a payment process of the user for the merchant.

Figure 4:
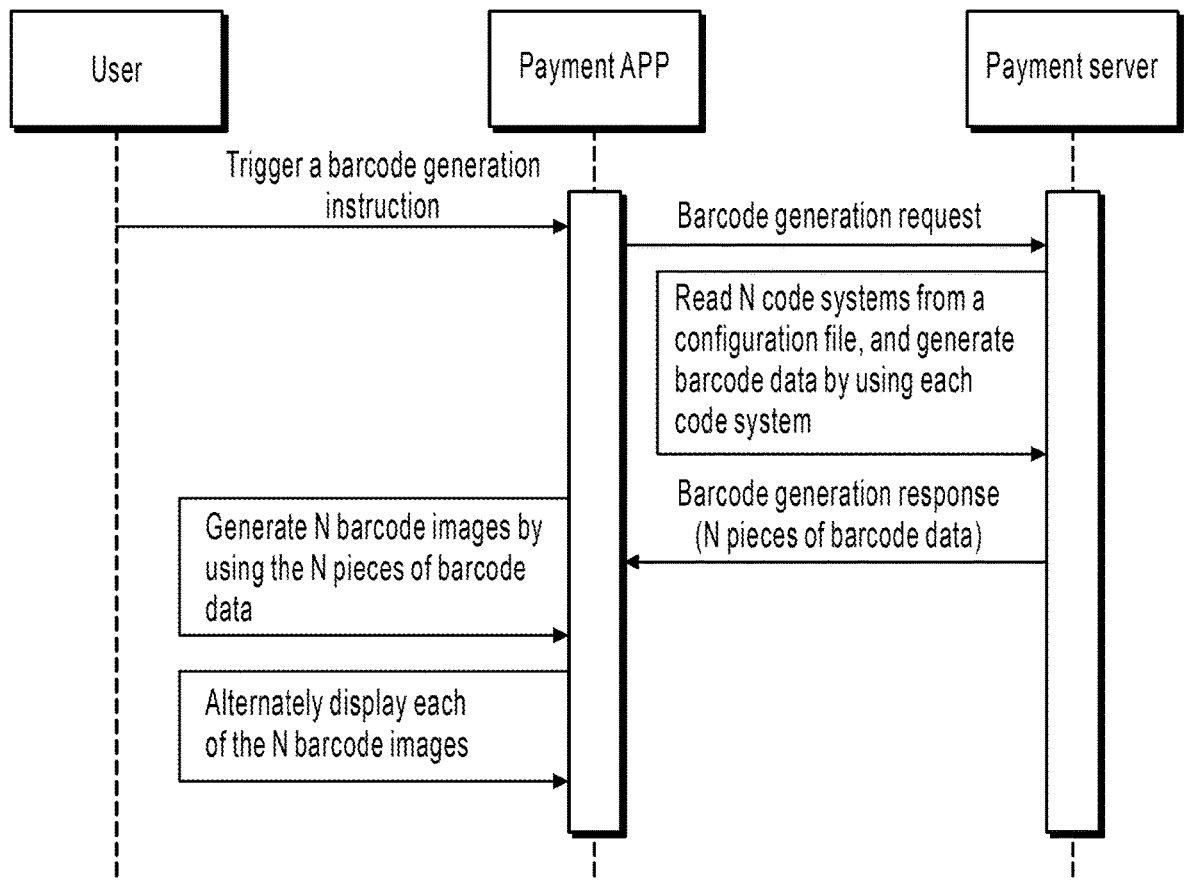
FIG. 4 is a flowchart illustrating an interaction between a user, an end-user device of the user, and a payment server in an application example of the present specification.

In this application example, when the user initiates a barcode payment service procedure, an interaction procedure between the user, the payment APP on the end-user device, and a payment server (a server) on the third-party payment platform is shown in FIG. 4. A barcode configuration file on the third-party payment platform stores N predetermined code systems.

After the user triggers a barcode generation instruction in the payment service procedure of the payment APP, the payment APP sends a barcode generation request to the payment server. The barcode generation request can include service-related information such as information indicating that a payment service is to be executed and information indicating a user account for making a payment.

After receiving the barcode generation request, the payment server generates original information of the barcode based on the service-related information in the barcode generation request, reads the code systems in the barcode configuration file, and encodes the original information by using the N code systems to obtain barcode data of each code system.

The payment server encapsulates the N pieces of barcode data in a barcode generation response and returns the barcode generation response to the payment APP on the end-user device of the user.

The payment APP extracts the N pieces of barcode data from the barcode generation response, generates a barcode image by using each piece of barcode data, and alternately displays each of the N barcode images in a predetermined duration for scanning by the scanning device of the merchant.

Figure 5:
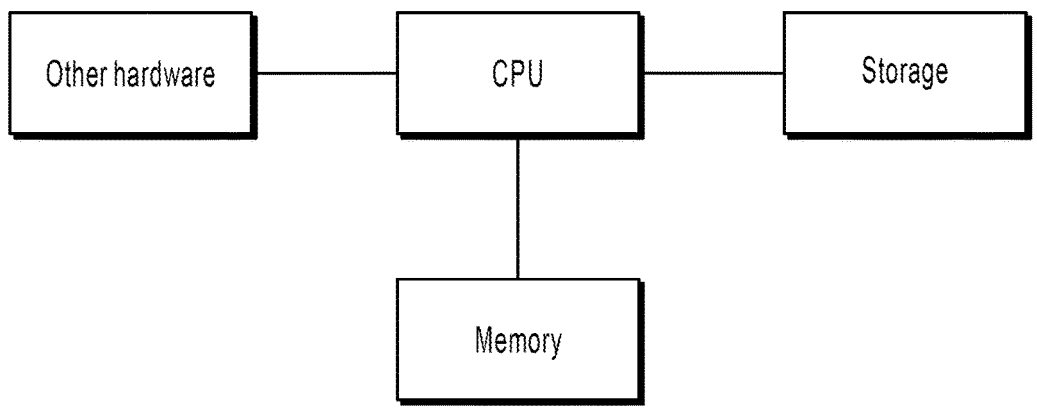
FIG. 5 is a structural diagram of hardware of a device for running implementations of the present specification.

Corresponding to the previous procedure implementation, implementations of the present specification further provide a barcode generation apparatus applied to a server, a barcode generation apparatus applied to an end-user device, and a barcode generation apparatus applied to a barcode provider. Each of the apparatuses can be implemented by software, hardware, or a combination of hardware and software. Software implementation is used as an example. As a logical apparatus, the apparatus is formed by reading a corresponding computer program by a central processing unit (CPU) in a device in which the apparatus is located and running the computer program in a memory. In terms of hardware, in addition to the CPU, the memory, and the storage shown in FIG. 5, the device in which the barcode generation apparatus is located usually includes other hardware such as a chip for sending and receiving radio signals and/or other hardware such as a card configured to implement a network communications function.

Figure 6:
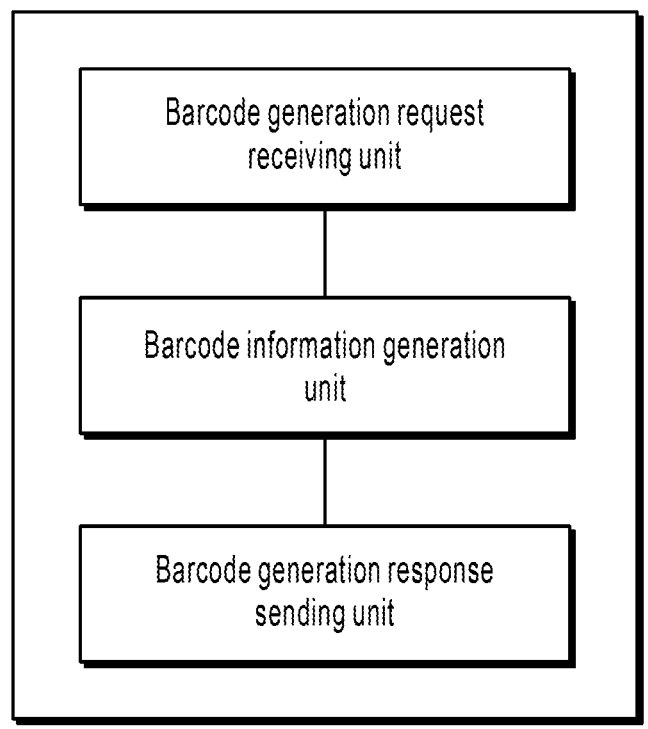
FIG. 6 is a logical structural diagram of a barcode generation apparatus applied to a server, according to an implementation of the present specification.

FIG. 6 illustrates a barcode generation apparatus applied to a server, according to an implementation of the present specification. The apparatus includes a barcode generation request receiving unit, a barcode information generation unit, and a barcode generation response sending unit. The barcode generation request receiving unit is configured to receive a barcode generation request sent by an end-user device. The barcode information generation unit is configured to generate at least two pieces of barcode information by using at least two code systems respectively based on the barcode generation request. The barcode generation response sending unit is configured to return a barcode generation response to the end-user device, where the barcode generation response includes the at least two pieces of generated barcode information, so that the end-user device alternately displays each barcode image corresponding to each piece of the at least two pieces of barcode information.

In an implementation, the barcode information generation unit is specifically configured to determine the at least two code systems based on information about a barcode scanning party, and generate barcode information by using each determined code system based on the barcode generation request.

In the previous implementation, the information about the barcode scanning party is included in the barcode generation request, and is obtained based on service information in the barcode generation request or positioning information of the end-user device.

Optionally, the barcode information includes barcode data, and each barcode image corresponding to each piece of the at least two pieces of barcode information includes a barcode image generated by the end-user device by using a piece of barcode data.

Figure 7:
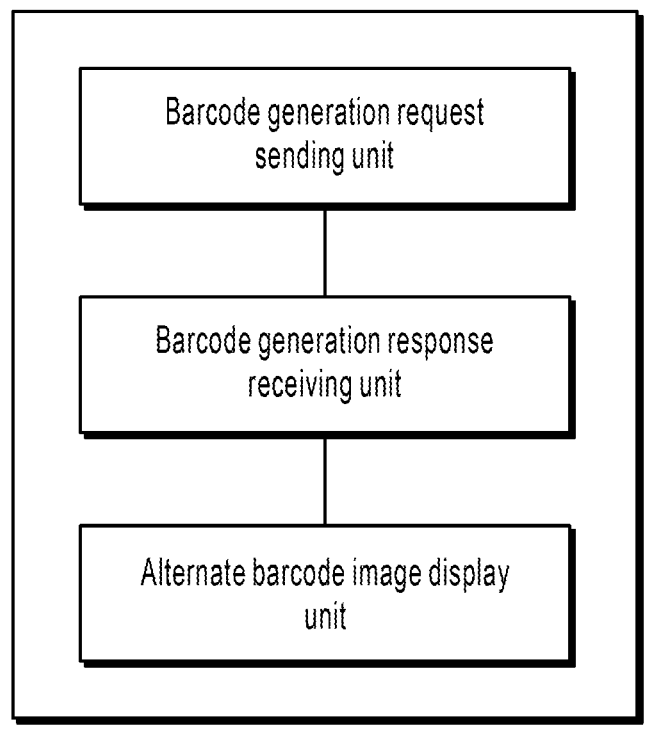
FIG. 7 is a logical structural diagram of a barcode generation apparatus applied to an end-user device, according to an implementation of the present specification.

FIG. 7 illustrates a barcode generation apparatus applied to an end-user device, according to an implementation of the present specification. The apparatus includes a barcode generation request sending unit, a barcode generation response receiving unit, and an alternate barcode image display unit. The barcode generation request sending unit is configured to send a barcode generation request to a server. The barcode generation response receiving unit is configured to receive a barcode generation response returned by the server, where the barcode generation response includes at least two pieces of barcode information generated by the server by using different code systems based on the barcode generation request. The alternate barcode image display unit is configured to alternately display each barcode image corresponding to each piece of the at least two pieces of barcode information.

Optionally, the barcode information includes barcode data; and the alternate barcode image display unit is specifically configured to generate each corresponding barcode image by using a corresponding piece of barcode data, and alternately display each barcode image.

Optionally, the alternate barcode image display unit is specifically configured to sequentially display each barcode image corresponding to each piece of the at least two pieces of barcode information in a corresponding predetermined duration.

Figure 8:
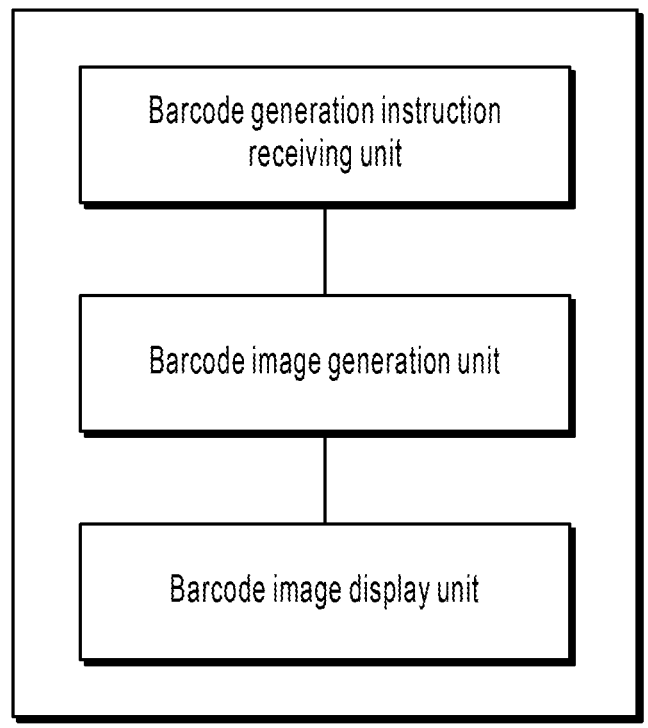
FIG. 8 is a logical structural diagram of a barcode generation apparatus applied to a barcode provider, according to an implementation of the present specification.

FIG. 8 illustrates a barcode generation apparatus applied to a barcode provider, according to an implementation of the present specification. The apparatus includes a barcode generation instruction receiving unit, a barcode image generation unit, and a barcode image display unit. The barcode generation instruction receiving unit is configured to receive a barcode generation instruction. The barcode image generation unit is configured to generate barcode images by using at least two code systems based on the barcode generation instruction. The barcode image display unit is configured to alternately display each of the barcode images.

Optionally, the barcode image generation unit is specifically configured to determine the at least two code systems based on the barcode generation instruction, and generate a corresponding barcode image by using each determined code system.

Optionally, the barcode generation instruction includes at least one of the following: an operation of instructing, by a user, to generate a barcode and an invoking request for generating a barcode.

Optionally, the barcode image display unit is specifically configured to sequentially display each of the barcode images in a corresponding predetermined duration.

An implementation of the present specification provides a computer device, and the computer device includes a memory and a processor. The memory stores a computer program that can be run by the processor. When the processor runs the stored computer program, the steps of the barcode generation method applied to the server in the implementations of the present specification are performed. For detailed description of the steps of the barcode generation method applied to the server, references can be made to the previous content. Details are omitted for simplicity.

An implementation of the present specification provides an end-user device, and the end-user device includes a memory and a processor. The memory stores a computer program that can be run by the processor. When the processor runs the stored computer program, the steps of the barcode generation method applied to the end-user device in the implementations of the present specification are performed. For detailed description of the steps of the barcode generation method applied to the end-user device, references can be made to the previous content. Details are omitted for simplicity.

An implementation of the present specification provides a computer device, and the computer device includes a memory and a processor. The memory stores a computer program that can be run by the processor. When the processor runs the stored computer program, the steps of the barcode generation method applied to the barcode provider in the implementations of the present specification are performed. For detailed description of the steps of the barcode generation method applied to the barcode provider, references can be made to the previous content. Details are omitted for simplicity.

An implementation of the present specification provides a computer-readable storage medium. The storage medium stores a computer program. When the computer program is run by a processor, the steps of the barcode generation method applied to the server in the implementations of the present specification are performed. For detailed description of the steps of the barcode generation method applied to the server, references can be made to the previous content. Details are omitted for simplicity.

An implementation of the present specification provides a computer-readable storage medium. The storage medium stores a computer program. When the computer program is run by a processor, the steps of the barcode generation method applied to the end-user device in the implementations of the present specification are performed. For detailed description of the steps of the barcode generation method applied to the end-user device, references can be made to the previous content. Details are omitted for simplicity.

An implementation of the present specification provides a computer-readable storage medium. The storage medium stores a computer program. When the computer program is run by a processor, the steps of the barcode generation method applied to the barcode provider in the implementations of the present specification are performed. For detailed description of the steps of the barcode generation method applied to the barcode provider, references can be made to the previous content. Details are omitted for simplicity.

The previous descriptions are merely better examples of implementations of the present specification, but are not intended to limit the present application. Any modification, equivalent replacement, or improvement made without departing from the spirit and principle of the present application shall fall within the protection scope of the present application.

In a typical configuration, a computing device includes one or more central processing units (CPUs), input/output interfaces, network interfaces, and memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that the terms "include", "comprise", and their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that an implementation of the present specification can be provided as a method, a system, or a computer program product. Therefore, the implementations of the present application can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A barcode generation method, comprising:
receiving, using a server, a barcode generation request sent by an end-user device;
generating, using the server and based on the barcode generation request, at least two pieces of barcode information by using at least two code systems, respectively; and
transmitting, using the server, a barcode generation response to the end-user device, wherein the barcode generation response comprises the at least two pieces of barcode information, wherein the barcode generation response causes an application running on the end-user device to display on the end-user device, in an alternating manner, a respective barcode image corresponding to each piece of the at least two pieces of barcode information.

2. The method according to claim 1, wherein the generating comprises:
identifying, based on information about a barcode scanning party, the at least two code systems; and
for each of the at least two pieces of barcode information, generating, based on the barcode generation request, a respective piece of barcode information by using one code system of the at least two code systems.

3. The method according to claim 2, further comprising:
obtaining, from the barcode generation request, the information about the barcode scanning party.

4. The method according to claim 2, wherein the identifying further comprises:
identifying, based on positioning information of the end-user device, a merchant at which the end-user device is located;
identifying a resolution of a barcode scanning device of the merchant;
identifying a plurality of code systems corresponding to the resolution of the barcode scanning device; and
identifying the at least two code systems from the plurality of code systems.

5. The method according to claim 1, wherein each piece of the at least two pieces of barcode information comprises a corresponding piece of barcode data, and wherein each barcode image is generated by the end-user device by using a corresponding piece of barcode data.

6. The method according to claim 1, further comprising:
   transmitting, by the application running on the end-user device, the barcode generation request to the server;
   receiving, by the application running on the end-user device and from the server, the barcode generation response; and
   causing, by the application running on the end-user device, a display on the end-user device of, alternately, each barcode image corresponding to each piece of the at least two pieces of barcode information.

7. The method according to claim 6, wherein the display comprises displaying, sequentially, each barcode image corresponding to each piece of the at least two pieces of barcode information for a corresponding predetermined duration.

8. A non-transitory, computer-readable medium storing one or more instructions executable by a computer system to perform operations comprising:
   receiving, using a server, a barcode generation request sent by an end-user device;
   generating, using the server and based on the barcode generation request, at least two pieces of barcode information by using at least two code systems, respectively; and
   transmitting, using the server, a barcode generation response to the end-user device, wherein the barcode generation response comprises the at least two pieces of barcode information, wherein the barcode generation response causes an application running on the end-user device to display on the end-user device, in an alternating manner, a respective barcode image corresponding to each piece of the at least two pieces of barcode information.

9. The non-transitory, computer-readable medium according to claim 8, wherein the generating comprises:
   identifying, based on information about a barcode scanning party, the at least two code systems; and
   for each of the at least two pieces of barcode information, generating, based on the barcode generation request, a respective piece of barcode information by using one code system of the at least two code systems.

10. The non-transitory, computer-readable medium according to claim 9, wherein the operations further comprise:
    obtaining, from the barcode generation request, the information about the barcode scanning party.

11. The non-transitory, computer-readable medium according to claim 9, wherein the identifying further comprises:
    identifying, based on positioning information of the end-user device, a merchant at which the end-user device is located;
    identifying a resolution of a barcode scanning device of the merchant;
    identifying a plurality of code systems corresponding to the resolution of the barcode scanning device; and
    identifying the at least two code systems from the plurality of code systems.

12. The non-transitory, computer-readable medium according to claim 8, wherein each piece of the at least two pieces of barcode information comprises a corresponding piece of barcode data, and wherein each barcode image is generated by the end-user device by using a corresponding piece of barcode data.

13. The non-transitory, computer-readable medium according to claim 8, wherein the operations further comprise:
    transmitting, by the application running on the end-user device, the barcode generation request to the server;
    receiving, by the application running on the end-user device and from the server, the barcode generation response; and
    causing, by the application running on the end-user device, a display on the end-user device of, alternately, each barcode image corresponding to each piece of the at least two pieces of barcode information.

14. The non-transitory, computer-readable medium according to claim 13, wherein the display comprises displaying, sequentially, each barcode image corresponding to each piece of the at least two pieces of barcode information for a corresponding predetermined duration.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
      receiving, using a server, a barcode generation request sent by an end-user device;
      generating, using the server and based on the barcode generation request, at least two pieces of barcode information by using at least two code systems, respectively; and
      transmitting, using the server, a barcode generation response to the end-user device, wherein the barcode generation response comprises the at least two pieces of barcode information, wherein the barcode generation response causes an application running on the end-user device to display on the end-user device, in an alternating manner, a respective barcode image corresponding to each piece of the at least two pieces of barcode information.

16. The computer-implemented system according to claim 15, wherein the generating comprises:
    identifying, based on information about a barcode scanning party, the at least two code systems; and
    for each of the at least two pieces of barcode information, generating, based on the barcode generation request, a respective piece of barcode information by using one code system of the at least two code systems.

17. The computer-implemented system according to claim 16, wherein the operations further comprise:
    obtaining, from the barcode generation request, the information about the barcode scanning party.

18. The computer-implemented system according to claim 16, wherein the identifying further comprises:
    identifying, based on positioning information of the end-user device, a merchant at which the end-user device is located;
    identifying a resolution of a barcode scanning device of the merchant;
    identifying a plurality of code systems corresponding to the resolution of the barcode scanning device; and
    identifying the at least two code systems from the plurality of code systems.

19. The computer-implemented system according to claim 15, wherein each piece of the at least two pieces of barcode information comprises a corresponding piece of barcode data, and wherein each barcode image is generated by the end-user device by using a corresponding piece of barcode data.

20. The computer-implemented system according to claim 15, wherein the operations further comprise:
   transmitting, by the application running on the end-user device, the barcode generation request to the server;
   receiving, by the application running on the end-user device and from the server, the barcode generation response; and
   causing, by the application running on the end-user device, a display on the end-user device of, alternately, each barcode image corresponding to each piece of the at least two pieces of barcode information.

\* \* \* \* \*